UNITED STATES PATENT OFFICE 2,374,807

ARYLAMINO COMPOUNDS

Joseph B. Dickey and James G. McNally, Rochester, N. Y., assignors to Eastman Kodak Company, Rochester, N. Y., a corporation of New Jersey No Drawing. Application March 20, 1943, Serial No. 479,906

6 Claims. (Cl. 260—500)

This invention relates to arylamino compounds containing a phosphono group and to photographic developing agents comprising such arylamino compounds. This application is a continuation-in-part of our copending application, Serial No. 301,467, filed October 26, 1939.

It is known that o- and p-phenylenediamine and some of their N-substituted derivatives act as photographic developers. N,N - diethyl - p-phenylenediamine is used as a photographic developer in color photography.

We have now found new phosphono derivatives of o- and p-arylenediamines and o- and p-aminophenols, and have further found that these derivatives are efficacious photographic developers.

It is, accordingly, an object of our invention to provide new arylenediamine and aminophenol derivatives and a process for the preparation thereof. A further object is to provide new photographic developing agents comprising these new derivatives. Other objects will become apparent hereinafter.

Our new arylamino compounds can be represented by the following general formulas:

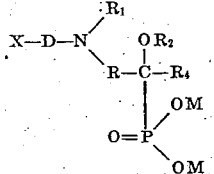

and

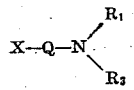

wherein D represents an o- or p-arylene group, e. g. an o- or p-phenylene group, R represents an alkylene group, e. g. methylene or ethylene, R1, R3 and R4 each represents hydrogen, or an alcohol radical, e. g. methyl, ethyl, n-propyl, isopropyl, cyclohexyl, benzyl, β-hydroxyethyl, β-acetylethyl, carbethoxymethyl, furfuryl, etc., R2 represents hydrogen or an acyl group, e. g. acetyl or benzoyl, M represents hydrogen or an alkali metal, X represents hydroxyl or amino, and Q represents an o- or p-arylene group, e. g. o- or p-phenylene, attached directly to which is a group of the following formula:

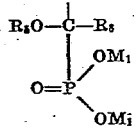

wherein $M_1$ represents hydrogen or alkali metal, $R_5$ represents hydrogen or an acyl group, e. g. acetyl or benzoyl, and $R_6$ represents an alcohol radical.

Our new arylamino compounds which are derivatives of arylene diamine can be prepared reducing the appropriate azo compound. We have found that the reductions are most advantageously accomplished by hydrogenating the nitro compounds in the presence of Raney nickel. Our new arylamino compounds which are derivatives of amino phenols can be prepared from the aforesaid phenylene-diamine derivatives by diazotization followed by hydrolysis of the diazonium salts, or by condensation of aminophenols with chlorohydroxyalkane phosphonic acids.

The following examples will serve to illustrate our new aryl amino compounds and the manner of preparing the same.

*Example 1—N - ethyl-N-(β-hydroxy-β-phosphonopropyl)-p-phenylene-diamine, disodium salt*

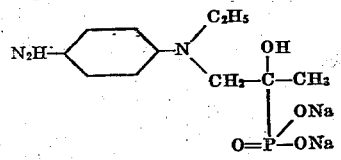

120 g. (1 mole) of ethylaniline, 205 g. (1.2 mole) of 1-chloro-2-hydroxypropane-2-phosphonic acid and 285.6 g. (3.4 moles) of sodium carbonate were heated with vigorous stirring at 100° C. When no more carbon dioxide was evolved, the mixture was steam distilled to remove unchanged ethylaniline. To the residue was added sodium acetate and o-chlorobenzenediazonium sulfate until a positive diazo test was obtained. The resulting azo dye was salted out and charged into a shaking autoclave with 20 g. of Raney nickel catalyst and 1000 cc. of methanol. The mixture was hydrogenated at 50° C. until 2 moles of hydrogen per mole of dye were taken up. The reaction mixture was cooled and the catalyst filtered off. It was then steam distilled to remove methanol and o-chloroaniline. The resulting aqueous mixture was concentrated under reduced pressure to obtain the phosphono derivative which is white when pure, but is unstable in air and has no definite melting point.

*Example 2—N-(β-hydroxyethyl)-N-(γ-hydroxy-γ-phosphono-n-butyl)-p-phenylenediamine*

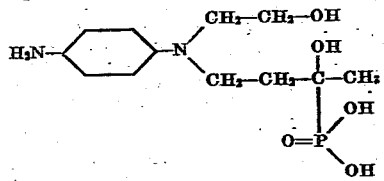

136 g. (1 mole) of β-hydroxyethylaniline, 226.3 g. (1.2 moles) of 1-chloro-3-hydroxybutane-3-phosphonic acid and 285.6 g. (3.4 moles) of sodium bicarbonate were heated with vigorous stirring, at 100° C. When no more carbon dioxide was evolved, the reaction was steam distilled to remove unchanged β-hydroxyethyl aniline. To the reaction mixture were added sodium acetate and o-chlorobenzenediazonium sulfate until a positive diazo test was obtained. The resulting azo dye was salted out and charged into a shaking autoclave with 20 g. of Raney nickel catalyst and one liter of methanol. The resulting mixture was hydrogenated at 50° C. until 2 moles of hydrogen for each mole of azo dye was taken up. The cooled reaction mixture was filtered to remove the catalyst and was then steam distilled to remove methanol and o-chloroaniline. The aqueous residue was concentrated in vacuo to obtain the disodium salt of the phosphono derivative. The disodium salt was treated with the calculated amount of 10 percent sulfuric acid to give the free phosphonic acid, a white crystalline compound which is unstable in air and possessing no definite melting point.

*Example 3—N⁴ - carbamidomethyl - N⁴ - (β - hydroxy-β-phosphono-propyl) -2-methyl-p-phenylenediamine, dipotassium salt*

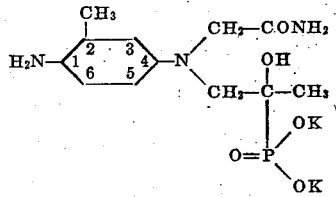

163.1 g. (1 mole) of N-(m-tolyl)-glycineamide, 275.2 g. (1.2 mole) of the dipotassium salt of 1-chloro-2-hydroxy propane-2-phosphonic acid and 120.1 g. (1.2 mole) of potassium bicarbonate were heated with vigorous stirring, at 100° C., until carbon dioxide was no longer evolved. The reaction mixture was then steam distilled to remove unchanged N-(m-tolyl)-glycine amide. To the reaction mixture were added potassium acetate and o-chlorobenzenediazonium sulfate until a positive diazo test was obtained. The resulting azo dye was salted out and charged into a shaking autoclave with 20 g. of Raney nickel catalyst and one liter of methanol. The resulting mixture was hydrogenated at 50° C. until 2 moles of hydrogen for each mole of azo dye was taken up. The cooled reaction mixture was filtered to remove the catalyst and then was steam distilled to remove methanol and o-chloroaniline. The aqueous residue was concentrated in vacuo to obtain the dipotassium salt of the phosphono derivative.

*Example 4—N,N-di-(β-hydroxy-β-phosphonopropyl)-1,4-naphthalenediamine*

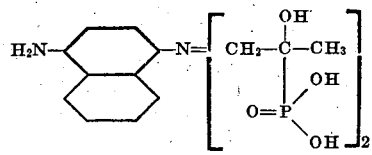

143.2 g. (1 mole) of α-naphthylamine, 410 g. (2.4 moles) of 1-chloro-2-hydroxypropane-2-phosphonic acid and 571.2 g. (6.8 moles) of sodium bicarbonate were heated with vigorous stirring at 100° C. When carbon dioxide was no longer evolved, the mixture was steam distilled to remove unchanged α-naphthylamine. To the residue was added sodium acetate and o-chlorobenzenediazonium sulfate until a positive diazo test was obtained. The resulting azo dye was salted out and charged into a shaking autoclave with 20 g. of Raney nickel catalyst and 1000 cc. of methanol. The mixture was hydrogenated at 50° C. until 2 moles of hydrogen per mole of dye were taken up. The reaction mixture was filtered to remove the catalyst and then steam distilled to remove methanol and o-chloroaniline. The resulting aqueous residue was concentrated in vacuo to obtain the disodium salt of the phosphono derivative. The disodium salt was treated with 10 percent sulfuric acid to obtain the free phosphonic derivative, a white substance when pure, but unstable in air and having no definite melting point.

*Example 5—N-(γ-hydroxy-γ-phosphono-n-butyl)-N-tetrahydrofurfuryl-p-aminophenol*

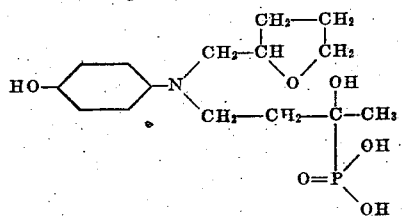

177.2 g. (1 mole) of N-tetrahydrofurfurylaniline, 226.3 g. (1.2 moles) of 1-chloro-3-hydroxybutane-3-phosphonic acid and 285.6 g. (3.4 moles) of sodium bicarbonate were heated with vigorous stirring at 100° C. When carbon dioxide was no longer evolved, the mixture was steam distilled to remove unchanged N-tetrahydrofurfurylaniline. To the residue was added sodium acetate and o-chlorobenzenediazonium sulfate until a positive diazo test was obtained. The resulting azo dye was salted out and charged into a shaking autoclave with 20 g. of Raney nickel catalyst and 1000 cc. of methanol. The mixture was hydrogenated at 50° C. until 2 moles of hydrogen per mole of dye were taken up. The reaction mixture was filtered to remove the catalyst and then steam distilled to remove methanol and o-chloroaniline. The resulting aqueous residue was concentrated in vacuo to obtain the disodium salt of the phosphono derivative of p-phenylenediamine. The disodium salt was treated with 10 percent sulfuric acid to obtain the free phosphono derivative. 32.7 g. (0.1 mole) of the free phosphono derivative of p-phenylenediamine were dissolved in 300 cc. of water and ice with 30 g. of concentrated sulfuric acid. The mixture was diazotized with 7.2 g. of sodium nitrite. When diazotization was complete, the diazotized mixture was added to a boiling solution of 200 cc. of water in a closed system through which carbon dioxide was passed continuously. After about 30 minutes boiling, 5 g. of animal charcoal were added and the mixture was filtered. The filtrate was concentrated in vacuo to obtain the phosphono derivative of p-aminophenol, a white substance which is unstable in air and has no definite melting point.

*Example 6—N-(γ-hydroxy-γ-phosphono-n-butyl)-o-aminophenol*

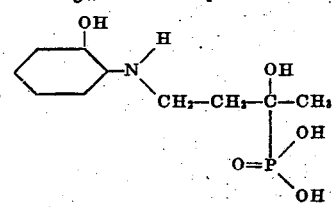

21.8 g. (0.2 mole) of o-aminophenol, 14 g. (0.1 mole) of 1-chloro-3-hydroxybutane-3-phosphonic acid and 8.4 g. (0.1 mole) of sodium bicarbonate were heated in n-primary butanol until carbon dioxide was no longer evolved. The n-butanol was removed under reduced pressure. To the residue were added 100 cc. of water and 8.4 g. of sodium bicarbonate. The resulting aqueous solution was extracted with ether to remove unreacted o-aminophenol. The aqueous residue was made neutral to litmus with sulfuric acid and then concentrated in vacuo to obtain the phosphono derivative of o-aminophenol.

*Example 7—N⁴, N⁴-di(β-methoxyethyl) - 2 - (α-acetoxy - α - phosphonoethyl) -p - phenylenediamine, disodium salt*

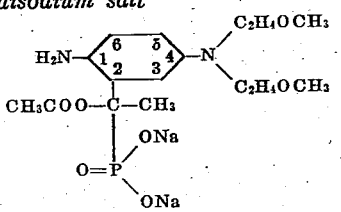

245.1 g. (1 mole) of m-(α-hydroxy-α-phosphonoethyl)-nitrobenzene were heated under reflux with 93.6 g. (1.2 moles) of acetyl chloride. When hydrogen chloride was no longer evolved, the reaction product was poured into water containing dissolved sodium chloride. The m-(β-acetoxy-α-phosphonoethyl) - nitrobenzene was washed with water by decantation. To the phosphono derivative mixed with water was added the calculated amount of sodium carbonate to form the disodium salt of the phosphono derivative. The resulting solution was charged into a shaking autoclave with 20 g. of Raney nickel catalyst and the mixture was hydrogenated at 50° C. under 1500 pounds pressure. The nickel catalyst was filtered off and the reaction mixture was concentrated to dryness under reduced pressure. The dry reaction product was mixed with 205 g. (2.5 moles) of fused sodium acetate. To the mixture was added, slowly with stirring at ordinary temperatures, 350 g. (2.5 moles) of β-methoxyethyl bromide. After addition of the bromide, the mixture was heated for several hours on a steam bath. The reaction mixture was then steam distilled. The aqueous residue, containing N,N-di-(β-methoxyethyl)-m-(α-acetoxy-α-phosphonoethyl)-aminobenzene disodium salt, was coupled with o-chlorobenzenediazonium sulfate, until a positive diazo test was obtained. The resulting azo dye was salted out and charged into a shaking autoclave with 20 g. of Raney nickel and one liter of methanol. The mixture was hydrogenated at 50° C. until 2 moles of hydrogen per mole of azo dye were taken up. The cooled reaction mixture was filtered to remove the catalyst and then steam distilled to remove methanol and o-chloroaniline. The resulting aqueous residue was concentrated in vacuo to obtain the disodium salt of the phosphono derivative of the phenylenediamine, a white compound of indefinite melting point and unstable in air.

*Example 8—N⁴-phenyl-2-(α - hydroxy - α - phosphonopropyl) -p-phenylene-diamine, disodium salt*

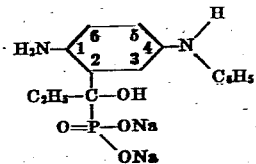

261.1 g. (1 mole) of m-(α-hydroxy-α-phosphonopropyl)-nitrobenzene were mixed with 106 g. (1 mole) of sodium carbonate and enough water to form a solution of the disodium salt of the phosphono derivative. The solution was charged into a shaking autoclave with 20 g. of Raney nickel catalyst and the mixture was hydrogenated at 50° C. under 1500 pounds pressure. The nickel catalyst was filtered off and the reaction mixture was charged into an autoclave with 188.4 g. (1.2 moles) of bromobenzene and 10 g. of active copper powder. The resulting mixture was heated at 220° to 240° C. for 24 hours. The reaction mixture was steam distilled to remove excess bromobenzene. The aqueous residue was concentrated somewhat in vacuo and the phenylated compound was separated from the aqueous portion of the mixture. The phenylated compound was extracted with 5 percent hydrochloric acid to remove non-phenylated amino compound. The residue from the extraction was then coupled with o-chlorobenzenediazonium sulfate, using sodium bicarbonate to complete the coupling. The resulting azo dye was salted out and charged into a shaking autoclave with 20 g. of Raney nickel catalyst and one liter of methanol. The mixture was hydrogenated at 50° C. until 2 moles of hydrogen for each mole of azo dye were taken up. The cooled mixture was filtered to remove catalyst and then steam distilled to remove methanol and o-chloroaniline. The resulting aqueous residue was concentrated in vacuo to obtain the disodium salt of the phosphono derivative of the phenylenediamine, a colorless compound of indefinite melting point and unstable in air.

*Example 9—N⁴,N⁴ - diethyl - 5 - (hydroxy-phosphonomethyl) -1,4-diaminonaphthalene*

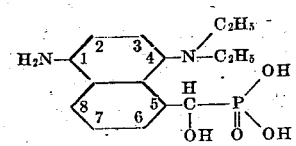

283.1 g. (1 mole) of 1-(hydroxy-phosphonomethyl)-8-nitronaphthalene were mixed with 106 g. (1 mole) of sodium carbonate and enough water to form a solution of the disodium salt of the phosphono derivative. The solution was charged into a shaking autoclave with 20 g. of Raney nickel catalyst and the mixture was hydrogenated at 50° C. under 1500 pounds pressure. The nickel catalyst was filtered off and the reaction mixture was mixed with 390 g. (2.5 moles) of ethyl iodide and 132.5 g. (1.25 moles) of sodium carbonate. The mixture was refluxed for several hours. To the cooled reaction mixture was added o-chlorobenzenediazonium sulfate until a positive diazo test was obtained. The resulting azo dye was salted out and charged into a shaking autoclave with 20 g. of Raney nickel catalyst and one liter of methanol. The mixture was hydrogenated at 50° C. until 2 moles of hydrogen for each mole of azo dye were taken up. The cooled mixture was filtered to remove the catalyst and then steam distilled to remove methanol and o-chloroaniline. The resulting aqueous residue was concentrated in vacuo to obtain the disodium salt of the phosphono derivative of the 1,4-diaminonaphthalene, a colorless compound of indefinite melting point and unstable in air.

Example 10—N,N-diethyl-3-(α-hydroxy-α-phosphonoethyl)-p-aminophenol

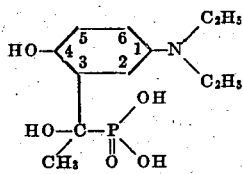

218.1 g. (1 mole) of o-(α-hydroxy-α-phosphonoethyl)phenol were placed in 1 liter of water containing 160 g. (4 moles) of sodium hydroxide. The mixture was warmed until a solution was obtained. The solution was cooled to 0° C. and 1 mole of o-chlorobenzene diazonium sulfate were added. The resulting azo dye was salted out and charged into a shaking autoclave with 20 g. of Raney nickel and 1 liter of methanol. The mixture was hydrogenated at 50° C. until 2 molecular proportions of hydrogen for each molecular proportion of azo dye were taken up. The catalyst was filtered off and the reaction mixture steam distilled to remove methanol and o-chlorobenzene. The 3-(α-hydroxy-α-phosphonoethyl)-p-aminophenol was salted out of the aqueous residue and washed first with cold 10 percent aqueous sodium sulfate and then with cold ethanol. 100 g. of the phosphono derivative thus obtained were charged into a shaking autoclave with 10 g. of Raney nickel and 500 cc. of ethanol. The autoclave was then heated at 220° to 240° C. for 30 hours. When cool, the reaction mixture was filtered to remove the nickel and the filtrate was concentrated to obtain the phosphono derivative of N,N-diethyl-p-aminophenol, a colorless compound of indefinite melting point and unstable in air.

Our new arylene diamine derivative can be used to form photographic images by development of exposed silver halide contained in the usual gelatin carriers, or in carriers, such as collodion, cellulose esters or resins. Those of our new phenylenediamine derivatives which are especially adapted to use in color photography (see above) can be used to develop visible images from latent images in silver halide emulsions, or to develop silver images from silver halide images which are obtained by a so-called reversal process or by rehalogenizing a visible silver image. When employed in connection with color photography, the phenylenediamine derivatives act as developers in the presence of couplers, and the oxidation products of the phenylenediamine derivatives, arising from the developing action, couple with the couplers or color-formers to give colored bodies or dye. When used for the formation of colored photographic images, the phenylenediamine derivatives can be used in conjunction with any well known coupler compounds, such as those described in Fischer U. S. Patent 1,102,028, dated June 30, 1914; Mannes and Godowsky U. S. Patent 2,108,602, dated February 15, 1938; Mannes, Godowsky and Peterson U. S. Patent 2,115,934, dated April 26, 1938, and Mannes, Godowsky and Peterson U. S. Patent 2,126,337, dated August 9, 1938.

All the arylenediamine derivatives described herein can be used for the purpose of producing black-and-white images from exposed photographic silver halide emulsions. Developing solutions comprising our new arylenediamine derivatives can be made up in the usual manner, using sodium sulfite and sodium carbonate.

The 1-chloro-2-hydroxypropane-2-phosphonic acid employed herein can be prepared from chloroacetone according to the phosphonation process described by Conant—J. Am. Chem. Soc. 42, 833, 2337; 43, 1667; 44, 2530. The following example will serve to illustrate the preparation.

Example 11—1-Chloro-2-hydroxypropane-2-phosphonic acid

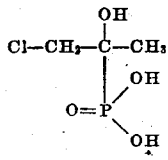

To 92 g. (1 mole) of chloroacetone were slowly added 150 g. (1.1 moles) of phosphorous trichloride, at 10° to 20° C. with stirring. Care should be taken that the reaction begins as soon as the addition of the phosphorous trichloride is started, as an accumulation of unreacted phosphorous trichloride may lead to an uncontrollable reaction. The reaction mixture should be protected from the moisture of the atmosphere, e. g. by means of a calcium chloride tube. The addition of phosphorous trichloride should be made over a period of about 1.5 hours. After all the phosphorous trichloride was added, the reaction mixture was stirred for several hours and then allowed to stand at about 20° C. for from 8 to 10 hours. At the end of this time, 298 g. (3.3 moles) of acetic acid is carefully added to the reaction mixture over a three-hour period, with stirring and cooling to keep the reaction mixture at 20° to 25° C. Protection from atmospheric moisture should be maintained. After addition of the acetyl acid, stirring was continued for several hours. Then the reaction mixture was distilled under reduced pressure to remove acetyl chloride. The residue of 1-chloro-2-hydroxypropane-2-phosphonic acid is a very viscous liquid of amber color, which solidifies upon standing. It needs no further purification. 1-chloro-3-hydroxybutane-3-phosphonic acid can be similarly prepared from β-chloroethyl methyl ketone.

The phosphonoalkyl nitro derivative employed in Examples 7, 8 and 9 can be prepared from nitroketones and nitroaldehydes as illustrated in the following examples.

Example 12—m-(α-Hydroxy-α-phosphonoethyl)-nitrobenzene

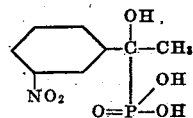

To 165 g. (1 mole) of m-nitroacetophenone were added slowly 171 g. (1.25 moles) of phosphorous trichloride at a temperature of 75° to 85° C., with stirring. Stirring is somewhat difficult at first, because of the high melting point of the m-nitroacetophenone, but as soon as 5 to 10 percent of the acid chloride has been added, the melting point is lowered enough so that there is obtained very efficient stirring. Care should be taken that there is no large amount of unreacted phosphorous trichloride present in the reaction mixture until near the end of the addition. After the addition, stirring and heating were continued for 5 to 6 hours. Then, 225 g. (3.75 moles) of acetic acid were added to the reaction mixture at 75° to 85° C. with efficient stirring and an effective cold water-cooled condenser. Stirring was continued for 3 hours after the addition, at 75° to 85° C. Then, the reaction mixture was distilled under reduced pressure to remove acetyl chloride. The residue was heated to about 100° C. in a good vacuum for a short time. The residue was a brown viscous liquid which soon solidified. It needs no further purification. If desired, the produce can be purified by pouring it while still liquid into a 5 percent aqueous sodium chloride solution at 60° to 70° C., with stirring. The phosphonated derivative can be separated from the aqueous liquors or it can be filtered off after it solidifies. In either case, it is advantageously washed with cold water before drying in the air. m-Nitrophenyl ethyl ketone can be similarly phosphonated to give m-(α-hydroxy - α - phosphonopropyl) - nitrobenzene, and 8-nitronaphthalene-1-aldehyde can be similarly phosphonated to give 1-(hydroxy-phosphonomethyl) - 8 - nitronaphthalene. The nitroketones can be prepared as described in Organic Syntheses, 10, 74.

The phosphono derivative employed in Example 10 can be prepared as illustrated in the following example:

*Example 13—o-(α-Hydroxy-α-phosphonoethyl)-phenol*

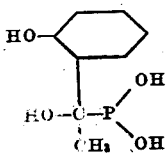

To 136 g. (1 mole) of o-hydroxyacetophenone were added, with stirring at 70° to 80° C., 295 g. (2.15 moles) of phosphorous trichloride over a two-hour period. The reaction mixture was stirred at 70° to 80° C. for 3 hours longer and then allowed to stand at 20° to 25° C. for several hours. To this mixture were added 327 g. (5.45 moles) of acetic acid at 45° to 50° C. over a five-hour period. An effective condenser is needed to keep the acetyl chloride from volatilizing. The reaction mixture was stirred three further hours at 40° to 50° C. and the acetyl chloride was then distilled from the reaction mixture under reduced pressure. One liter of 10 percent aqueous hydrochloric acid was then added to the residue, and the resulting suspension was heated with stirring at 75° to 85° C. for three hours. The oily layer was separated while hot and washed twice with hot water. The washed product is a dark brown viscous liquid which soon solidifies. It can be employed without further purification.

The term "alcohol radical," in accordance with customary usage, is intended to mean an organic radical, which corresponds to an ancohol and is derived therefrom by dropping the hydroxyl group, e. g. n-propyl is derived from n-propyl alcohol by dropping the OH group, benzyl is derived from benzyl alcohol by dropping the OH group, and tertiary butyl is derived by dropping the OH group from tertiary butyl alcohol.

What we claim as our invention and desire to be secured by Letters Patent of the United States is:

1. An arylamino compound characterized by the following general formula:

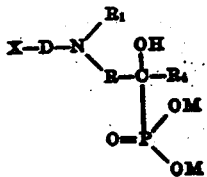

wherein D represents an arylene group selected from the group consisting of o- and p-arylene groups, M represents a member selected from the group consisting of hydrogen and alkali metals, R represents an alkylene group, $R_1$ represents a member selected from the group consisting of hydrogen and alcohol radicals, $R_4$ represents an alcohol radical, and X represents a member selected from the group consisting of hydroxyl and amino groups.

2. An arylamino compound characterized by the following general formula:

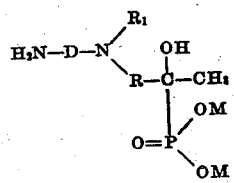

wherein D represents a p-phenylene group, M represents a member selected from the group consisting of hydrogen and alkali metals, R represents an alkylene group, $R_1$ represents an alcohol radical.

3. An arylamino compound characterized by the following general formula:

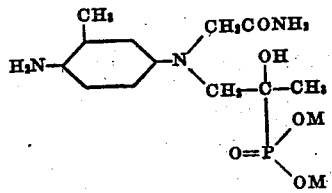

wherein M represents a member selected from the group consisting of hydrogen and alkali metals.

4. An arylamino compound of the following formula:

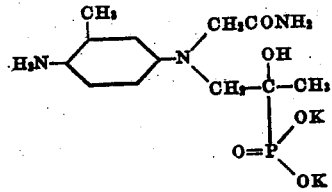

5. An arylamino compound of the following formula:

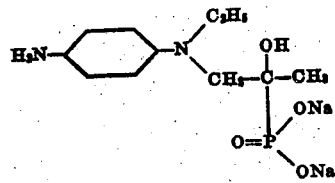

6. An arylamino compound of the following formula:

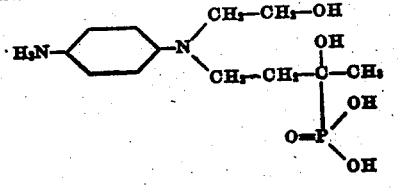

JOSEPH B. DICKEY.
JAMES G. McNALLY.